US009421491B2

(12) United States Patent
Tsujiuchi et al.

(10) Patent No.: US 9,421,491 B2
(45) Date of Patent: Aug. 23, 2016

(54) $CO_2$ RECOVERY APPARATUS AND $CO_2$ RECOVERY METHOD

(75) Inventors: Tatsuya Tsujiuchi, Tokyo (JP); Hiroshi Tanaka, Tokyo (JP); Hiromitsu Nagayasu, Tokyo (JP); Takuya Hirata, Tokyo (JP); Tsuyoshi Oishi, Tokyo (JP); Takashi Kamijo, Tokyo (JP); Masahiko Tatsumi, Hyogo (JP); Yasuyuki Yagi, Hyogo (JP); Kazuhiko Kaibara, Hyogo (JP)

(73) Assignees: MITSUBISHI HEAVY INDUSTRIES, LTD., Tokyo (JP); THE KANSAI ELECTRIC POWER CO., INC., Osaka (JP)

( * ) Notice: Subject to any disclaimer, the term of this patent is extended or adjusted under 35 U.S.C. 154(b) by 125 days.

(21) Appl. No.: 14/235,636

(22) PCT Filed: Sep. 10, 2012

(86) PCT No.: PCT/JP2012/073101
§ 371 (c)(1),
(2), (4) Date: Jan. 28, 2014

(87) PCT Pub. No.: WO2013/039040
PCT Pub. Date: Mar. 21, 2013

(65) Prior Publication Data
US 2014/0150653 A1 Jun. 5, 2014

(30) Foreign Application Priority Data
Sep. 13, 2011 (JP) .................................. 2011-199883

(51) Int. Cl.
*B01D 53/14* (2006.01)
*B01D 53/62* (2006.01)

(52) U.S. Cl.
CPC ....... *B01D 53/1418* (2013.01); *B01D 53/1475* (2013.01); *B01D 53/62* (2013.01);
(Continued)

(58) Field of Classification Search
CPC ................. B01D 2258/0283; B01D 53/1412; B01D 53/1418; B01D 53/1425; B01D 53/1475; B01D 53/62; B01D 2252/204; B01D 2252/20478; Y02C 10/04; Y02C 10/06
See application file for complete search history.

(56) References Cited

U.S. PATENT DOCUMENTS

| 3,339,342 A | 9/1967 | Blaker et al. |
| 5,378,442 A | 1/1995 | Fujii et al. |

(Continued)

FOREIGN PATENT DOCUMENTS

| CA | 2 719 602 A1 | 6/2011 |
| CA | 2 719 640 A1 | 6/2011 |

(Continued)

OTHER PUBLICATIONS

Decision of a Patent Grant dated Mar. 31, 2015, issued in corresponding Japanese Patent Application No. 2011-199883, with English translation (3 pages).

(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

The $CO_2$ recovery apparatus is provided with a $CO_2$ absorption portion for absorbing $CO_2$ in a $CO_2$-containing exhaust gas by a $CO_2$ absorbing liquid, a water washing portion provided on the upper portion side of the $CO_2$ absorption portion so as to cool a $CO_2$-removed exhaust gas and also recover the accompanying $CO_2$ absorbing liquid, a washing liquid circulation line for directly circulating a washing liquid containing the $CO_2$ absorbing liquid recovered in the water washing portion, an extraction line for extracting part of the washing liquid containing the $CO_2$ absorbing liquid as an extracted liquid from the washing liquid circulation line, a concentration portion for separating a gas component (water vapor) from the extracted liquid while concentrating the $CO_2$ absorbing liquid, and a concentrated liquid feed line for feeding a concentrated liquid concentrated in the concentration portion to the side of an absorbing liquid regeneration tower.

5 Claims, 4 Drawing Sheets

(52) U.S. Cl.
CPC ..... *B01D53/1425* (2013.01); *B01D 2252/204* (2013.01); *B01D 2252/20478* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 2008/0307968 A1 | 12/2008 | Kang et al. |
| 2011/0135550 A1* | 6/2011 | Nagayasu .......... B01D 53/1418 423/230 |
| 2011/0146489 A1 | 6/2011 | Dube et al. |
| 2011/0158891 A1* | 6/2011 | Nagayasu .......... B01D 53/1418 423/437.1 |

FOREIGN PATENT DOCUMENTS

| | | | |
|---|---|---|---|
| EP | 1 132 125 | A1 | 9/2001 |
| EP | 2 269 711 | A1 | 12/2009 |
| EP | 2 269 713 | A2 | 1/2011 |
| EP | 2 338 583 | A2 | 6/2011 |
| FR | 2 938 454 | A1 | 5/2010 |
| JP | 05-245340 | A | 9/1993 |
| JP | 08-080421 | A | 3/1996 |
| JP | 2002-126439 | A | 5/2002 |
| JP | 2008-296216 | A | 12/2008 |
| JP | 2011-115724 | A | 6/2011 |
| JP | 2011-136258 | A | 7/2011 |
| WO | 2010/102877 | A1 | 9/2010 |
| WO | 2012/153812 | A1 | 11/2012 |

OTHER PUBLICATIONS

Office Action dated Mar. 18, 2015, issued in corresponding Canadian Patent Application No. 2,843,597 (3 pages).
Partial Supplementary European Search Report dated Mar. 24, 2015, issued in corresponding European Patent Application No. 12831224.6 (6 pages).
International Search Report dated Dec. 18, 2012, issued in corresponding application No. PCT/JP2012/073101.
Written Opinion dated Dec. 18, 2012, issued in corresponding application No. PCT/JP2012/073101.
English translation of the Written Opinion dated Dec. 18, 2012, issued in PCT/JP2012/073101 (6 pages).
Extended European Search Report dated Jul. 28, 2015, issued in counterpart European Patent Application No. 12831224.6 (10 pages).
Notice of Acceptance dated Oct. 30, 2015, issued in counterpart Australian Application No. 2012309539 (3 pages).

* cited by examiner

$CO_2$ RECOVERY APPARATUS AND $CO_2$ RECOVERY METHOD

FIELD

The present invention relates to a $CO_2$ recovery apparatus and a $CO_2$ recovery method for reducing concentration of amine compounds remaining in and being emitted from a decarbonated exhaust gas from which $CO_2$ has been removed by being contacted with an absorbing liquid.

BACKGROUND

As a cause of global warming, the greenhouse effect due to $CO_2$ is pointed out, and countermeasures against the same must be quickly taken internationally in saving the global environment. Various fields of human activity burning fossil fuel as generation sources of $CO_2$, the demand for suppression of $CO_2$ emissions is further increasing. Accordingly, for power generation facilities such as thermal power plants and the like using a large amount of fossil fuel, a method that exhaust gas from a boiler is contacted with an amine-based absorbing liquid such as an aqueous solution of amine compound so as to remove $CO_2$ in the exhaust gas and recover the same is energetically studied.

When recovering $CO_2$ from exhaust gas using such an absorbing liquid, a decarbonated exhaust gas from which the $CO_2$ is recovered is accompanied by the absorbing liquid and anime compounds derived from the absorbing liquid. Additionally, in order to prevent air pollution by the amine compounds, it is necessary to reduce the discharge amount of the amine compounds which are emitted together with the decarbonated exhaust gas.

Conventionally, Patent Literature 1 discloses that plural stages of water washing portions which recover an amine compound accompanied by a decarbonated exhaust gas by bringing a washing liquid into contact with the decarbonated exhaust gas from which $CO_2$ is absorbed and removed by a gas-liquid contact with an absorbing liquid are provided, and a recovery process of an amine compound accompanying a decarbonated exhaust gas is sequentially performed in the plural stages of the water washing portions. For the washing liquid of Patent Literature 1, condensed water obtained by condensing and separating moisture contained in $CO_2$ in a process where $CO_2$ is diffused from an amine-based absorbing liquid which has absorbed the $CO_2$ so as to regenerate the amine-based absorbing liquid is used.

Further, conventionally, Patent Literature 2 discloses that a cooling portion where a decarbonated exhaust gas from which $CO_2$ is absorbed and removed by a gas-liquid contact with an absorbing liquid is cooled, and a contact portion where condensed water which has been condensed in the cooling portion and the decarbonated exhaust gas are in counterflow contact with each other. Furthermore, Patent Literature 2 discloses that a water washing portion which recovers an amine compound accompanying a decarbonated exhaust gas by bringing a washing liquid into contact with the decarbonated exhaust gas from which $CO_2$ is absorbed and removed by a gas-liquid contact with an absorbing liquid are provided, and for the washing liquid, condensed water which has been condensed in a cooling tower where exhaust gas before $CO_2$ is recovered therefrom is used.

CITATION LIST

Patent Literatures

Patent Literature 1: Japanese Patent Application Laid-open No. 2002-126439

Patent Literature 2: Japanese Patent Application Laid-open No. 8-80421

SUMMARY

Technical Problem

However, in recent years, it is desired to further reduce concentration of components of an absorbing liquid remaining in and being emitted from a decarbonated exhaust gas in terms of environmental preservation. Especially, when installing $CO_2$ recovery apparatuses for exhaust gas from thermal power plants and the like which have a large amount of flow of processing gas anticipated in the future, a large amount of exhaust gas is emitted, and thereby the emission amount of components of an absorbing liquid remaining in and being emitted from a decarbonated exhaust gas tends to increase. Therefore, it is necessary to further reduce the concentration of emitted components of an absorbing liquid.

The present invention is to solve the above-mentioned problem and to provide a $CO_2$ recovery apparatus and a $CO_2$ recovery method capable of further reducing concentration of amine compounds remaining in and being emitted from a decarbonated exhaust gas.

Solution to Problem

According to a first aspect of the present invention in order to solve the problem, there is provided a $CO_2$ recovery apparatus including: a $CO_2$ absorption tower for bringing a $CO_2$-containing exhaust gas containing $CO_2$ and a $CO_2$ absorbing liquid into contact with each other so as to remove $CO_2$ and make a purified exhaust gas; and an absorbing liquid regeneration tower for separating $CO_2$ from the $CO_2$ absorbing liquid which has absorbed $CO_2$ so as to regenerate the $CO_2$ absorbing liquid, wherein a lean solution from which $CO_2$ has been removed in the absorbing liquid regeneration tower is reused in the $CO_2$ absorption tower, and wherein the $CO_2$ absorption tower comprises: a $CO_2$ absorption portion for absorbing $CO_2$ in the $CO_2$-containing exhaust gas by the $CO_2$ absorbing liquid, a water washing portion for cooling a $CO_2$-removed exhaust gas by a washing liquid and for recovering the $CO_2$ absorbing liquid which accompanies the same, the water washing portion being provided on a side of a downstream flow of a gas flow of the $CO_2$ absorption portion; a washing liquid circulation line for supplying the washing liquid containing the $CO_2$ absorbing liquid recovered in the water washing portion from a side of a top of the water washing portion so as to circulate and wash the washing liquid; an extraction line for extracting a part of the washing liquid containing the $CO_2$ absorbing liquid as an extracted liquid from the washing liquid circulation line; a concentration portion for concentrating the $CO_2$ absorbing liquid while separating a gas component from the extracted liquid; and a concentrated liquid feed line for feeding a concentrated liquid concentrated in the concentration portion to the absorbing liquid regeneration tower.

According to a second aspect of the present invention, there is provided the $CO_2$ recovery apparatus according to the first aspect including a gas exhaust line for merging the gas component into the purified exhaust gas exhausted from the $CO_2$ absorption tower.

According to a third aspect of the present invention, there is provided the $CO_2$ recovery apparatus according to the first aspect wherein a cooling tower for cooling the $CO_2$-containing exhaust gas containing $CO_2$ is provided on a side of an upstream flow of the $CO_2$ absorption tower so as to set a temperature ($T_2$) of the purified exhaust gas exhausted from the $CO_2$ absorption tower lower than a temperature ($T_1$) of the $CO_2$-containing exhaust gas containing $CO_2$ cooled in the cooling tower ($T_1 > T_2$).

According to a fourth aspect of the present invention, there is provided the $CO_2$ recovery apparatus according to the first aspect wherein a water is supplied to the water washing portion from an outside or an inside of a system.

According to a fifth aspect of the present invention, there is provided a $CO_2$ recovery method for using a $CO_2$ absorption tower for removing $CO_2$ by bringing a $CO_2$-containing exhaust gas containing $CO_2$ and a $CO_2$ absorbing liquid into contact with each other so as to remove $CO_2$ and an absorbing liquid regeneration tower for regenerating the $CO_2$ absorbing liquid by separating $CO_2$ from the $CO_2$ absorbing liquid absorbing $CO_2$ so as to reuse a lean solution from which $CO_2$ has been removed in the absorbing liquid regeneration tower in the $CO_2$ absorption tower, wherein a $CO_2$-removed exhaust gas is cooled by a washing liquid and also part of a water washing portion for recovering the $CO_2$ absorbing liquid which accompanies the same is extracted as an extracted liquid in a side of a downstream flow of the $CO_2$ absorption tower, and wherein the $CO_2$ absorbing liquid in the extracted liquid is concentrated and the concentrated liquid is fed to a side of the absorbing liquid regeneration tower.

Advantageous Effects of Invention

According to the present invention, concentration of amine compounds of an absorbing liquid remaining in and being emitted from a decarbonated exhaust gas can be further reduced, and also recovered absorbing liquid can be concentrated to be reused.

DESCRIPTION OF EMBODIMENTS

Hereunder, the present invention will be specifically described referring to the figures. Note that the present invention is not limited by these embodiments, and when there are plural embodiments, they include what are configured by combining each embodiment. Further, components in the embodiments below include what a person skilled in the art can easily conceive or what is substantially identical to the same.

First Embodiment

Figure 1:
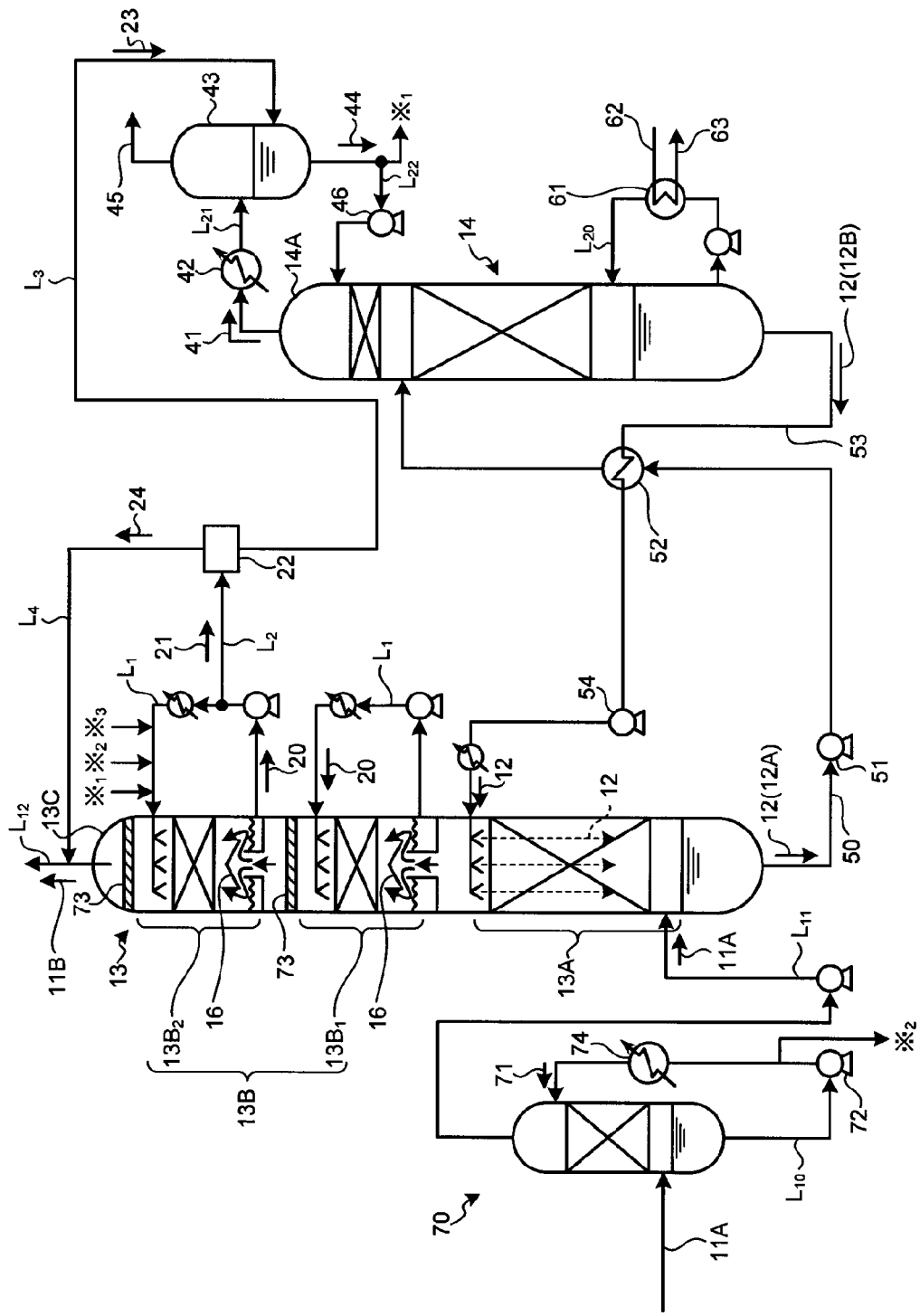
FIG. 1 is a schematic view of a $CO_2$ recovery apparatus according to a first embodiment.
Figure 2:
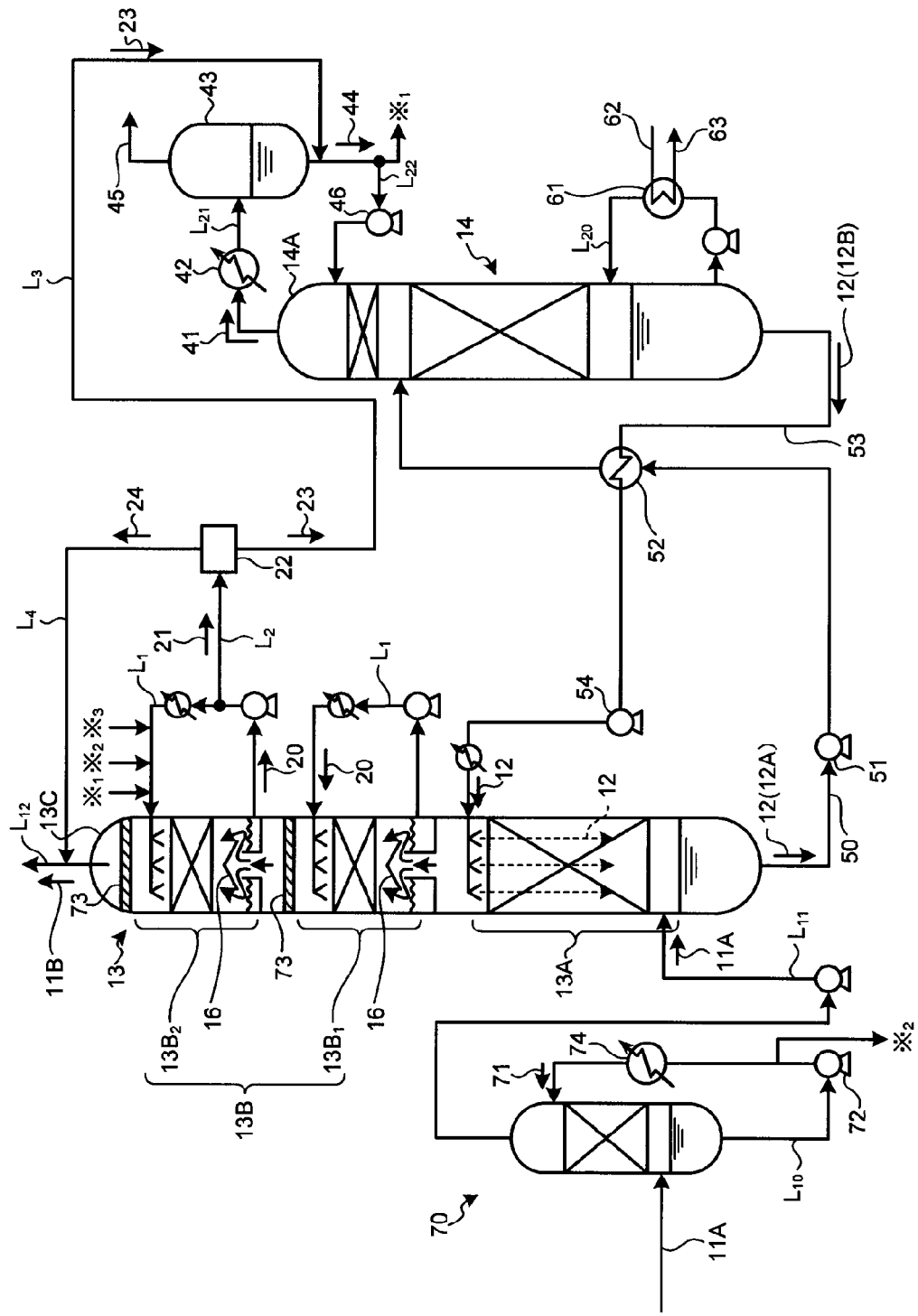
FIG. 2 is a schematic view of another recovery apparatus according to First embodiment.
Figure 3:
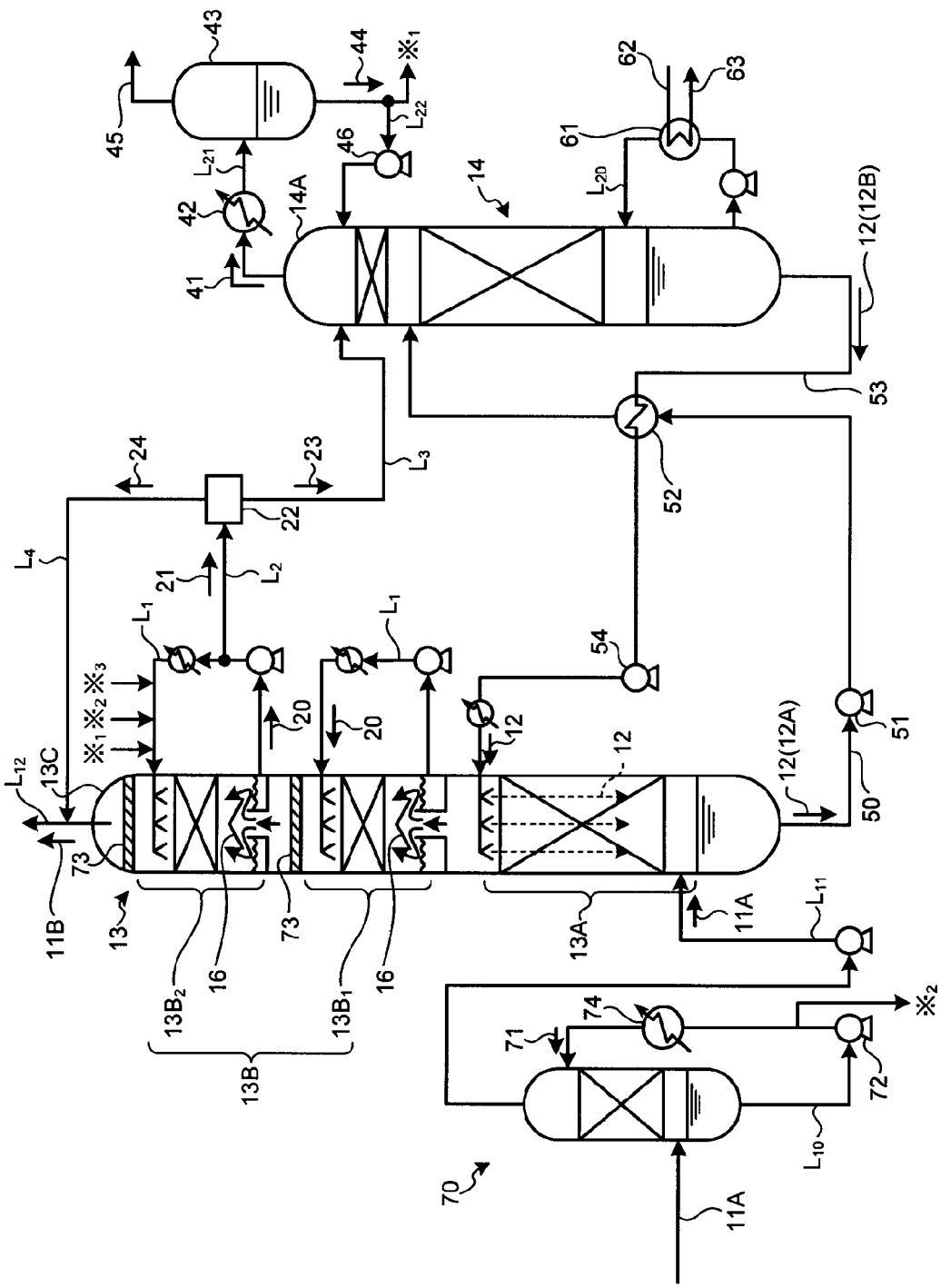
FIG. 3 is a schematic view of another recovery apparatus according to First embodiment.

The $CO_2$ recovery apparatus according to the present invention will be described referring to the figures. FIG. 1 is a schematic view of the $CO_2$ recovery apparatus according to a first embodiment. FIG. 2 and FIG. 3 are schematic views of another recovery apparatuses according to the first embodiment.

As illustrated in FIG. 1, a $CO_2$ recovery apparatus 10A according to this embodiment includes a $CO_2$ absorption tower (hereunder, also referred to as "absorption tower") 13 where a $CO_2$-containing exhaust gas 11A which contains $CO_2$ and a $CO_2$ absorbing liquid (a lean solution 12B) are contacted with each other so as to remove $CO_2$, thereby obtaining a purified exhaust gas 11B, an absorbing liquid regeneration tower 14 where a $CO_2$ absorbing liquid which has absorbed $CO_2$ (a rich solution 12A) is regenerated, a $CO_2$ absorption portion 13A which is a $CO_2$ recovery apparatus reusing the lean solution B from which $CO_2$ has been removed in the absorbing liquid regeneration tower (hereunder, also referred to as "regeneration tower") 14, and in which the $CO_2$ absorption tower 13 absorbs $CO_2$ in the $CO_2$-containing exhaust gas 11A with a $CO_2$ absorbing liquid 12 (the lean solution 12B), a water washing portion 13B which is composed of a first water washing portion $13B_1$ and a second water washing portion $13B_2$ provided on the upper (the downstream flow of the gas flow) side of the $CO_2$ absorption portion 13A for cooling $CO_2$-removed exhaust gas as well as recovering the accompanying $CO_2$ absorbing liquid 12, a washing liquid circulation line $L_1$ where a washing liquid 20 containing the $CO_2$ absorbing liquid 12 which has been recovered at the second water washing portion $13B_2$ on the tower top portion side is directly circulated from the top side of the water washing portion 13B, an extraction line $L_2$ where part of the washing liquid 20 containing the $CO_2$ absorbing liquid 12 is extracted as an extracted liquid 21 from the washing liquid circulation line $L_1$, a concentration portion 22 where a gas component (water vapor) 24 is separated from the extracted liquid 21 while the $CO_2$ absorbing liquid is concentrated, a concentrated liquid feed line $L_3$ where the concentrated liquid 23 which has been concentrated in the concentration portion 22 is fed to the absorbing liquid regeneration tower 14 side, and a gas exhaust line $L_4$ where the separated gas component (water vapor) 24 is merged into the purified exhaust gas 11B exhausted from the absorption tower 13.

Note that the washing liquid 20 is circulated in the first water washing portion $13B_1$ as well in combination with the washing liquid circulation line $L_1$.

Also note that, although not illustrated, the extracted liquid 21 from the first water washing portion $13B_1$ is merged into the $CO_2$ absorbing liquid 12.

In the absorption tower 13, the $CO_2$-containing exhaust gas 11A is brought into counterflow contact with the alkanolamine-based $CO_2$ absorbing liquid 12 in the $CO_2$ absorption portion 13A provided on the lower side of the $CO_2$ absorption tower 13, and $CO_2$ in the $CO_2$-containing exhaust gas 11A is absorbed by the $CO_2$ absorbing liquid 12 by a chemical reaction ($R-NH_2+H_2O+CO_2 \rightarrow R-NH_3HCO_3$).

Then, the $CO_2$-removed exhaust gas after $CO_2$ is removed rises to the water washing portion 13B side via a chimney tray 16 and is brought into gas-liquid contact with the washing liquid 20 supplied from the top side of the water washing portion 13B so as to recover the $CO_2$ absorbing liquid 12 accompanying the $CO_2$-removed exhaust gas.

After that, the purified exhaust gas 11B from which the $CO_2$ absorbing liquid 12 has been removed is exhausted outside from a tower top portion 13C of the $CO_2$ absorption tower 13. Note that a sign 73 indicates a mist eliminator which captures mist in gas.

The rich solution 12A having absorbed $CO_2$ is boosted by a rich solvent pomp 51 interposed in a rich solution supply tube 50, heated by the lean solution 12B regenerated in the absorbing liquid regeneration tower 14 in a rich/lean solution heat exchanger 52, and supplied to the top side of the absorbing liquid regeneration tower 14.

The rich solution 12A emitted from the top side of the regeneration tower 14 to the inside of the tower emits most of $CO_2$ by heating by means of water vapor from the tower bottom. The $CO_2$ absorbing liquid 12 emitting part or most of $CO_2$ in the regeneration tower 14 is called "semi-lean solution". The semi-lean solution, not illustrated, becomes the lean solution 12B from which almost all $CO_2$ has been removed when it flows down to the bottom of the regeneration tower 14. The lean solution 12B is heated by saturated water vapor 62 in a regeneration heater 61 interposed in a circulation line $L_{20}$. The saturated water vapor 62 after heating becomes water-vapor-condensed water 63.

On the other hand, a $CO_2$ gas 41 accompanied by water vapor dissipated from the rich solution 12A and the semi-lean solution, not illustrated, in the tower is emitted from a tower top portion 14A of the regeneration tower 14.

Then, the $CO_2$ gas 41 accompanied by water vapor is guided out by a gas exhaust line $L_{21}$, the water vapor is concentrated by a condenser 42 interposed in the gas exhaust line $L_{21}$, a condensed water 44 is separated in a separation drum 43, and a $CO_2$ gas 45 is emitted out of the system and separately subjected to post-processing such as compression recovery.

The condensed water 44 which has been separated in the separation drum 43 is supplied to the upper portion of the absorbing liquid regeneration tower 14 by a condensed water circulation pump 46 interposed in a condensed water line $L_{22}$.

Note that, although not illustrated, part of the condensed water 44 is supplied to the top of the water washing portion 13B as the washing liquid 20 of the $CO_2$ absorbing liquid and used for absorbing the $CO_2$ absorbing liquid 12 accompanying the $CO_2$-removed exhaust gas.

The regenerated $CO_2$ absorbing liquid (lean solution 12B) is sent to the $CO_2$ absorption tower 13 side by a lean solution pump 54 via a lean solution supply tube 53, and circulatedly used as the $CO_2$ absorbing liquid 12.

Accordingly, the $CO_2$ absorbing liquid 12 forms a closed passage circulating through the $CO_2$ absorption tower 13 and the absorbing liquid regeneration tower 14, and is reused in the $CO_2$ absorption portion 13A of the $CO_2$ absorption tower 13. Note that the $CO_2$ absorbing liquid 12 is supplied by a replenishment line which is not illustrated as necessary, and a $CO_2$ absorbing liquid is regenerated by a reclaimer which is not illustrated as necessary.

Additionally, the $CO_2$-containing exhaust gas 11A supplied to the $CO_2$ absorption tower 13 is cooled by cooling water 71 in a cooling tower 70 provided to its front stage side, and then introduced into the $CO_2$ absorption tower 13. Note that a sign 72 indicates a circulation pump, a sign 74 indicates a cooling apparatus, $L_{10}$ indicates a cooling water circulation line, $L_{11}$ indicates a $CO_2$-containing exhaust gas supply line, and $L_{12}$ indicates a purified exhaust gas exhaust line, respectively.

Thus, the $CO_2$ absorbing liquid 12 which is circulatedly used through the $CO_2$ absorption tower 13 and the absorbing liquid regeneration tower 14 brings a $CO_2$-removed exhaust gas from which $CO_2$ has been removed and the washing liquid 20 into counterflow contact with each other and the $CO_2$ absorbing liquid 12 accompanying the $CO_2$-removed exhaust gas is absorbed and removed by the washing liquid 20 in the water washing portion 13B so as to prevent diffusion to the outside of the absorption tower 13.

In order to reuse the $CO_2$ absorbing liquid 12 absorbed and removed by the washing liquid 20, in this embodiment, a concentration portion 22 is provided and the $CO_2$ absorbing liquid 12 is fed to the absorbing liquid regeneration tower 14 side via a concentrated liquid feed line $L_3$ which feeds a concentrated liquid 23 which is concentrated in the concentration portion 22 so as to concentrate and use the $CO_2$ absorbing liquid 12.

In this embodiment, part of the washing liquid 20 circulating in the water washing portion 13B is extracted and concentrated in the concentration portion 22 to make the concentrated liquid 23 which is fed to the separation drum 43 separating $CO_2$ in the absorbing liquid regeneration tower 14.

The separation drum 43 separates the $CO_2$ gas 45 from the $CO_2$ gas 41 accompanied by water vapor so as to obtain the condensed water 44 which is recirculated to the upper portion of the absorbing liquid regeneration tower 14, thereby being the lean solution 12B to be reused in the $CO_2$ absorption tower 13 again.

Note that a supply destination of the concentrated liquid 23 is not limited to the separation drum 43, and it may be the condensed water line $L_{22}$ which returns the condensed water 44 to the upper portion of the regeneration tower 14 as illustrated in FIG. 2, for example.

Also, the supply destination of the concentrated liquid 23 may be directly introduced to the upper portion of the regeneration tower 14, as illustrated in FIG. 3.

Also, part of the condensed water 44 ($*_1$) may be extracted from the condensed water line $L_{22}$ and supplied to the washing liquid circulation line $L_1$ ($*_1$) so as to be used as a washing liquid.

Also, part of the cooling water 71 of the cooling tower 70 ($*_2$) may be extracted and supplied to the washing liquid circulation line $L_1$ ($*_2$) so as to be used as a washing liquid.

Also, other than water inside the system of the $CO_2$ recovery apparatus, water from the outside of the system (for example, ion exchange water of a process system or the like) may be supplied to the washing liquid circulation line $L_1$ ($*_3$) so as to be used as a washing liquid.

Thus, in this embodiment, when the washing liquid 20 is circulated in the washing liquid circulation line $L_1$, it recovers a $CO_2$ absorbing liquid and the recovered $CO_2$ absorbing liquid is made to a concentrated liquid, and thereby the amount of diffusion of a $CO_2$ absorbing liquid accompanying the purified exhaust gas 11B and a volatile component derived from the absorbing liquid into the air can be reduced.

Note that, in the concentration portion 22, an evaporation apparatus and a vapor compressing concentration apparatus or the like, for example, can be used. The evaporation apparatus in which the washing liquid 20 is heated to be evaporated while being stored in an evaporator, the concentrated liquid 23 is supplied to the next evaporator, and also the water vapor 24 can be used as a heating source in the next evaporator, and the evaporators are provided plurally can be exemplified.

Also, the vapor compressing concentration apparatus pressurizes the water vapor 24 generated in the evaporator with a compressor so as to raise the temperature, thereby using the same as a heat source for heating, and can reduce power consumption upon concentration.

Note that, water vapor may be supplied upon concentration.

Additionally, in the gas exhaust line $L_4$ to which the gas component (water vapor) 24 separated in the concentration portion 22 is guided out, a separation drum is provided to prevent accompaniment of moisture to the outside and also prevent dissipation of moisture to the outside of the system.

Note that, when introducing the gas component 24 to the side of the tower top portion 13C of the absorption tower 13, it is emitted to the outside as it is. Therefore, in a case of being accompanied by ammonia, it may be introduced to the downstream flow side (inside of the tower top portion) of the water washing portion 13B thereof.

Second Embodiment

Figure 4:
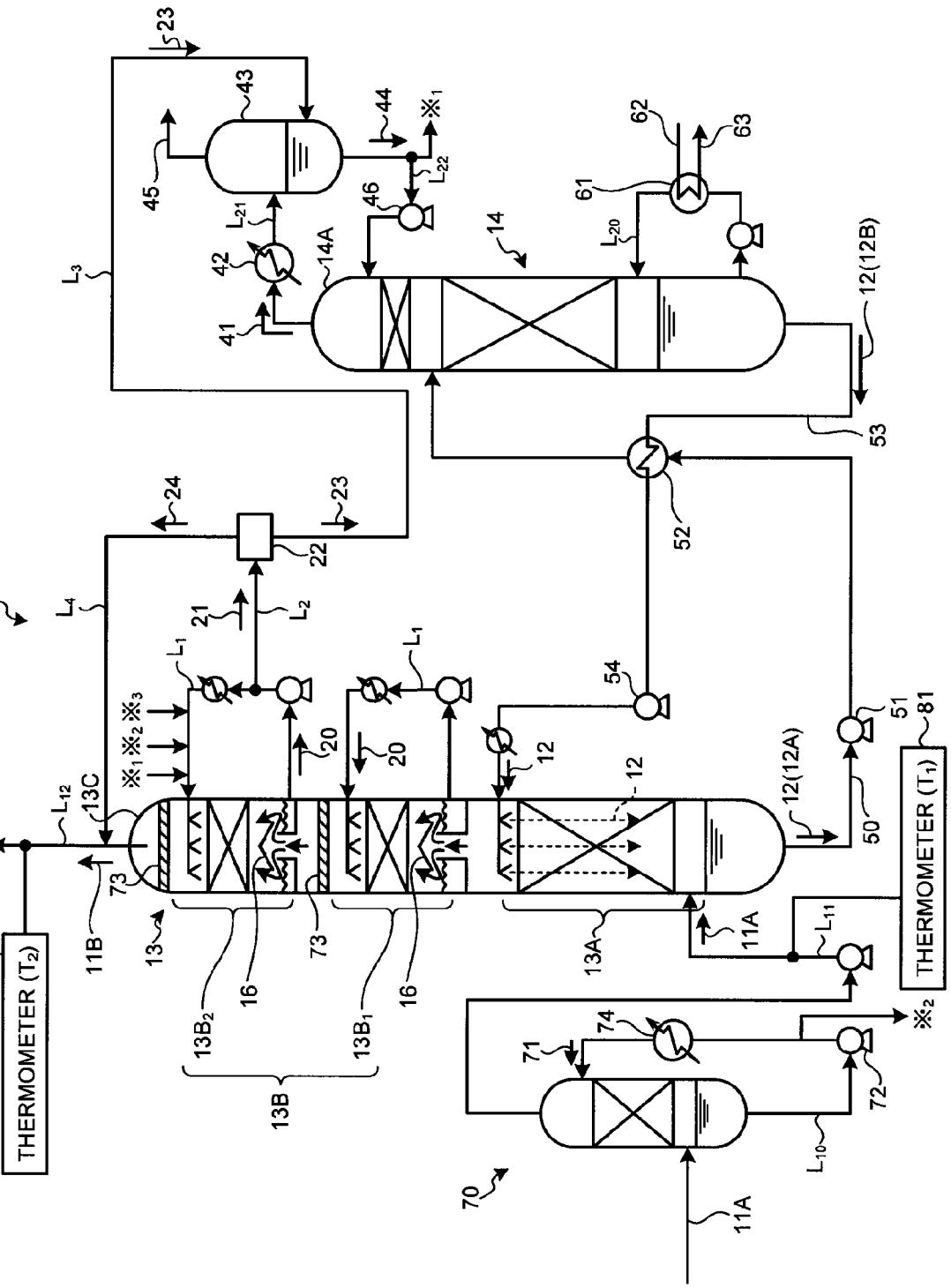
FIG. 4 is a schematic view of a $CO_2$ recovery apparatus according to a second embodiment.

FIG. 4 is a schematic view of a $CO_2$ recovery apparatus according to a second embodiment. Note that, configurations identical to the $CO_2$ recovery apparatus 10A according to First embodiment illustrated in FIG. 1 are followed by the identical signs to omit overlapping descriptions.

As illustrated in FIG. 4, in a $CO_2$ recovery apparatus 10B of this embodiment, a thermometer 81 and a thermometer 82 are provided to the $CO_2$-containing exhaust gas supply line $L_{11}$ and the purified exhaust gas exhaust line $L_{12}$ respectively to measure gas temperature.

Then, as a result of a measurement, a control apparatus, not illustrated, controls a gas temperature of the purified exhaust gas 11B at the outlet of the water washing portion 13B ($T_2$) so as to set the same lower than a gas temperature at the outlet of the cooling tower 70 ($T_1$) ($T_1 > T_2$).

As a result, lowering the gas temperature of the purified exhaust gas 11B at the outlet of the $CO_2$ absorption tower 13 ($T_2$) makes it possible to increase the amount of condensed water, and consequently, amine concentration in liquid in the water washing portion 13B is reduced, amine vapor pressure becomes lower, and the amount of accompanying $CO_2$ absorbing liquid (amine solution or the like) is reduced, thereby making it possible to reduce emissions thereof to the outside.

When the gas temperature of the purified exhaust gas 11B ($T_2$) is lowered from 40° C. to 35° C. here, it is confirmed that amine compound concentration ratio in gas of the purified exhaust gas 11B is decreased to 0.5 at 35° C. with respect to 1 at 40° C.

As described above, according to the present invention, concentration of amine compounds remaining in and being emitted from a decarbonated exhaust gas can be further reduced, and also a concentrated absorbing liquid can be effectively reused.

REFERENCE SIGNS LIST 10A, 10B $CO_2$ RECOVERY APPARATUS
11A $CO_2$-CONTAINING EXHAUST GAS
12 $CO_2$ ABSORBING LIQUID
12A RICH SOLUTION
12B LEAN SOLUTION
13 $CO_2$ ABSORPTION TOWER (ABSORPTION TOWER)
14 ABSORBING LIQUID REGENERATION TOWER (REGENERATION TOWER)
20 WASHING LIQUID
21 EXTRACTED LIQUID
22 CONCENTRATION PORTION
23 CONCENTRATED LIQUID
24 GAS COMPONENT

The invention claimed is:

1. A $CO_2$ recovery apparatus comprising:
a $CO_2$ absorption tower for bringing a $CO_2$-containing exhaust gas and a $CO_2$ absorbing liquid into contact with each other so as to remove $CO_2$ and make a purified exhaust gas; and
an absorbing liquid regeneration tower for separating $CO_2$ from the $CO_2$ absorbing liquid which has absorbed $CO_2$ so as to regenerate the $CO_2$ absorbing liquid,
wherein a lean solution from which $CO_2$ has been removed in the absorbing liquid regeneration tower is reused in the $CO_2$ absorption tower, and
wherein the $CO_2$ absorption tower comprises:
a $CO_2$ absorption portion for absorbing $CO_2$ in the $CO_2$-containing exhaust gas by the $CO_2$ absorbing liquid,
a water washing portion for cooling a $CO_2$-removed exhaust gas by a washing liquid and for recovering the $CO_2$ absorbing liquid which accompanies the $CO_2$-removed exhaust gas, the water washing portion being provided downstream of the $CO_2$ absorption portion;
a washing liquid circulation line for supplying the washing liquid containing the $CO_2$ absorbing liquid recovered in the water washing portion to a side of a top of the water washing portion so as to circulate and wash the washing liquid;
an extraction line for extracting a part of the washing liquid containing the $CO_2$ absorbing liquid as an extracted liquid from the washing liquid circulation line;
a concentration portion for concentrating the $CO_2$ absorbing liquid while separating a gas component from the extracted liquid so as to produce a concentrated liquid;
a separation drum for separating a $CO_2$ gas accompanied by water vapor from an upper portion of the absorbing liquid regeneration tower so as to produce a condensed water; and
a concentrated liquid feed line for connecting between the concentration portion and the upper portion of the absorbing liquid regeneration tower and feeding the concentrated liquid from the concentration portion directly to the upper portion of the absorbing liquid regeneration tower.

2. The $CO_2$ recovery apparatus according to claim 1, further comprising a gas exhaust line for merging the gas component into the purified exhaust gas exhausted from the $CO_2$ absorption tower.

3. The $CO_2$ recovery apparatus according to claim 1, further comprising a cooling tower for cooling the $CO_2$-containing exhaust gas so as to set a temperature ($T_2$) of the purified exhaust gas exhausted from the $CO_2$ absorption tower lower than a temperature ($T_1$) of the $CO_2$-containing exhaust gas containing $CO_2$ cooled in the cooling tower ($T_1 > T_2$), the cooling tower being provided upstream of the $CO_2$ absorption tower.

4. The $CO_2$ recovery apparatus according to claim 1 wherein a water is supplied to the water washing portion from an outside or an inside of a system.

5. A $CO_2$ recovery method for using a $CO_2$ absorption tower for removing $CO_2$ by bringing a $CO_2$-containing exhaust gas and a $CO_2$ absorbing liquid into contact with each other so as to remove $CO_2$ and an absorbing liquid regeneration tower for regenerating the $CO_2$ absorbing liquid by separating $CO_2$ from the $CO_2$ absorbing liquid absorbing $CO_2$ so as to reuse a lean solution from which $CO_2$ has been removed in the absorbing liquid regeneration tower in the $CO_2$ absorption tower,
the $CO_2$ recovery method comprising:
downstream of the $CO_2$ absorption tower, cooling a $CO_2$-removed exhaust gas with a washing liquid and recovering the $CO_2$ absorbing liquid accompanied by $CO_2$-removed exhaust gas;

supplying the washing liquid containing $CO_2$ absorbing liquid recovered in a water washing portion to a side of a top of the water washing portion so as to circulate and wash the washing liquid;

extracting a part of the washing liquid containing the $CO_2$ absorbing liquid as an extracted liquid;

concentrating the $CO_2$ absorbing liquid contained in the extracted liquid as a concentrated liquid;

separating a $CO_2$ gas accompanied by water vapor from the absorbing the absorbing liquid regeneration tower so as to produce a condensed water; and feeding the concentrated liquid directly to an upper portion of the absorbing liquid regeneration tower.

* * * * *